United States Patent [19]
Pendleton et al.

[11] Patent Number: 5,982,753
[45] Date of Patent: Nov. 9, 1999

[54] METHOD OF TESTING A SWITCHED LOCAL AREA NETWORK

[75] Inventors: Blair D. Pendleton; Manfred R. Arndt, both of Colorado Springs, Colo.

[73] Assignee: Fluke Corporation, Everett, Wash.

[21] Appl. No.: 08/871,304

[22] Filed: Jun. 9, 1997

[51] Int. Cl.⁶ .................................. H04J 1/16; H04J 3/14; H04L 12/28; H04L 1/00
[52] U.S. Cl. ........................... 370/252; 370/254; 709/223
[58] Field of Search ...................................... 370/242, 245, 370/252, 241–55; 709/223, 224

[56] References Cited

U.S. PATENT DOCUMENTS

| | | | |
|---|---|---|---|
| 5,485,455 | 1/1996 | Dobbins et al. | 370/60 |
| 5,568,471 | 10/1996 | Hershey et al. | 370/17 |
| 5,737,518 | 4/1998 | Grover et al. | 395/183.14 |

*Primary Examiner*—Douglas W. Olms
*Assistant Examiner*—David R Vincent
*Attorney, Agent, or Firm*—Douglas J. Barker

[57] ABSTRACT

A test instrument and method for testing switched LANs using a set of available MIBs in a switch is provided. The test instrument is designed for the characterization, diagnosis, and testing of a LAN having at least one switch which divides the network traffic into segments. A network device such as a switch will have a set of available MIBs, usually determined by the vendor, which may be accessed via an SNMP agent in the switch. Using the information selectively gathered from this set of available MIBs, various reports may be generated and displayed as reports which allow for a detailed analysis of switch parameters and traffic patterns. For any given report, optimal data items are chosen according to a predetermined hierarchy which provide the most pertinent, detailed information for each given report.

14 Claims, 6 Drawing Sheets

METHOD OF TESTING A SWITCHED LOCAL AREA NETWORK

BACKGROUND OF THE INVENTION

This invention relates generally to test instruments for local area networks (LANs) and in particular to a method in a test instrument for analyzing and testing a switched LAN.

Increasingly complex LANs now connect more and more types of devices including personal computers, work stations, file servers, and printers. Network hubs are often the central devices in a network through which information flows. Each client device connects to the LAN via adapters called network interface cards (NICs) to form nodes. Connecting the nodes to the hubs are network links which may be unshielded twisted pair (UTP) wire, coaxial cable, or fiber optic cable.

Network protocols for controlling the communication of information between the nodes have been developed, including Ethernet which is defined according to the IEEE 802.3 standard and Token Ring which is defined according to the IEEE 802.5 standard. Ethernet uses a method called carrier-sensing multiple access with collision detection (CSMA/CD) to control information flow and resolve collisions between nodes. A node can send information on the network only if no other node is currently sending information. If a node tries to send information at the same time as another node, a collision occurs and each node operates according to a defined "back off" procedure to resolve the collision. Each node will wait a random period of time to attempt to send the information again.

Because Ethernet is typically implemented in a baseband, broadcast network, every node receives the information sent by every other node within the collision domain. In order to minimize the burden on the software operating in host personal computers (PC's) connected to the network, a hardware layer with a hardware or media access control (MAC) address passes along to the software layer only the information appropriate for that node. Such information may be in the form of a "broadcast" message intended for all nodes in the network or as a message only for the intended node with the MAC address.

Information sent over an Ethernet network is in the form of discrete packets defined according to the seven layer Open Systems Interconnection (OSI) standard maintained by the American National Standards Institute (ANSI). OSI is a layered structure in which the highest layers take advantage of the capabilities of the lower layers to send information between nodes. Information is passed between nodes in the form of discrete packets containing data or control information supplied by the various OSI layers. The highest layers are the Application layer, the Presentation layer, and the Session layer which may include Telnet, File Transfer Protocol (FTP), Simple Mail Transfer Protocol (SMTP), and Domain Name System (DNS).

The Transport layer typically includes the Transmission Control Protocol (TCP) along with the User Datagram Protocol (UDP), among others, which provide for the delivery of the data to a desired device and the division of the information into discrete packets for sending. Received packets are reassembled in a like manner. The Network layer (level 2) routes messages back and forth between a source node and a destination node according to Internet Protocol (IP) addresses by adding an IP header to each packet indicating the source and destination IP addresses. The lowest layer is the physical link layer in which the hardware MAC addresses are used.

The original Ethernet baseband model, in which all of the network devices reside on the same collision domain, typically linked together on a common coaxial cable or by using a shared hub in the 10BASE-T environment, is commonly referred to as a shared LAN. Because of increasing demands for available bandwidth, shared LANs are rapidly giving way to switched LANs in which a switched hub (switch) replaces or supplants the shared hub. Now, each collision domain may be separated into segments, with the switch selectively switching traffic between various segments of the LAN. The most common architecture of a switched LAN is to provide a switch between a number of segments, with each segment typically comprising separate work groups and with the majority of network traffic traveling between the server and each of the segments. With the exception of the segment that the server is on, each of the other segments benefit from increased bandwidth because they do not see the network traffic from the other segments. Because the server's segment typically becomes the performance bottleneck in the LAN, its maximum speed is increased, for example from 10 Mbps to 100 Mbps, to increase overall network performance.

IP broadcast messages on one segment are forwarded to other segments within the same broadcast domain. Higher level switching functions such as virtual LAN (VLAN) have been implemented which determine the scope of a broadcast domain.

Network managers need to have the ability to control network devices and monitor the traffic patterns within a given LAN using a central console which uses network management software to control multiple switches, routers, bridges, and other network devices. Built-in processing capability operating according to known standards is typically provided within each of these network devices, allowing them to be remotely programmed and queried to provide data back to the central console via SNMP (simple network management protocol) commands. SNMP is the current TCP/IP network management protocol defined according to RFC 1157. The built-in processing capability in the network devices operates in software as an SNMP agent which keeps control and status information that the network manager can access in the form of a MIB (management information base). A MIB specifies the data items a device must keep and the operations allowed on each data item.

Because no single vendor owns the TCP/IP technology, the Internet Architecture Board (IAB), and the Internet Engineering Task Force (IETF) which operates under the IAB, sets the standards using a series of technical reports called Requests for Comments (RFCs). Further information about the IAB, IETF, and RFCs may be found in Comer, Douglas, E., "Internetworking with TCP/IP, Volume 1: Principles, Protocols, and Architecture", Prentice-Hall, Inc., 1995.

The standard TCP/IP MIB is known as MIB-II, which is defined according to RFC 1213. Network devices may support other MIBs in addition to the standard MIB-II. RMON (remote monitoring) MIBs, defined according to RFC 1757, provide additional information not available from MIB-II, such as more detailed statistical and error information on any particular port of a switch. Transmission MIBs, including Ethernet according to RFC 1643, FDDI (fiber distribution data interface) according to RFC 1285 and 1512, and Token Ring according to RFC 1748, are tailored to provide information particular to the network media. Bridge MIBs, defined according to RFC 1493, contain a table of MAC addresses attached to various ports of the switch. Finally, a vendor may choose to adopt their own private MIBs, which, although adhering to agreed upon protocols defined according to the RFCs, contain proprietary commands and data items. The number of MIBs continues to expand as network devices gain improved capabilities and functionality.

While network management software provides for overall network control as well as detailed monitoring of any particular condition on the network using the available MIBs, the capability of such software to troubleshoot and find errors may be overwhelmed by the volume of information that may be collected. No capability is provided to selectively obtain information pertinent for troubleshooting and analysis. The problem is exacerbated by the increasing use of switches which divide the network traffic into segments, thus making the use of such diagnostic tools as protocol analyzers impractical. Therefore, it would be desirable to provide a method for testing switched LANs by using the information gathered from the set of available MIBs in the switch to provide useful diagnostic information to the user.

SUMMARY OF THE INVENTION

In accordance with the present invention, a method employed in a test instrument for testing switched LANs using a set of available MIBs in the switch is provided. The method allows for the characterization, diagnosis, and testing of a LAN having at least one switch which divides the network traffic into segments. A network device such as a switch will have a set of available MIBs, usually determined by the vendor, which may be accessed via an SNMP agent in the switch. Because the network traffic on a switched LAN is divided into segments, only a fraction of the total traffic is available on any given port. It is therefore desirable to use the information stored in the set of available MIBs to effectively test all the segments of the LAN without having to physically connect the test instrument to each segment.

In operation, the test instrument is first connected to the switched LAN, without any knowledge of the switched LAN configuration. The test instrument may then be prompted to conduct a segment discovery test in which the network devices within the broadcast domain are analyzed to detect local hosts, switches, routers, bridges, and other network devices, and further determine addressing information such as IP addresses, MAC addresses, and subnet masks. A data base of MAC and IP addresses of the various devices is compiled. Upon detection during segment discovery, a switch may then be selected for further analysis using a series of reports from its set of available MIBs. The types of reports, as well as the hierarchical structure that links the reports together, depend on the contents of the set of available MIBs as well as the particular ports selected for analysis.

Using the information selectively gathered from this set of available MIBs, various reports may be generated and displayed which allow for a detailed analysis of switch parameters and traffic patterns. For any given report, optimal data items are chosen according to a predetermined hierarchy which provide the most pertinent, detailed information for each given report and for each given port or interface. A switch typically has ports as listed according to the bridge MIB and also has interfaces which correspond the ports but may also include the backplane and SNMP agent. For example, a report of utilization and error percentages for various ports of the switch may be displayed using data items collected by the SNMP agent according to MIB II. A more detailed report of percent utilization, percent collisions, and percent broadcasts may be created for a selected port of the switch using data items from an RMON MIB. A detailed breakdown of the types of errors occurring on the port may then be selected.

The various reports generated may be linked together in a hierarchical structure such as a logical chain or tree pattern to allow the user to easily move between reports as part of the diagnostic process. An inverted tree structure, for example, may be constructed which allows for "drilling down" to obtain increasingly detailed and specific diagnostic information in a logical manner to aid the user in the diagnostic process.

It is may be desirable to have a report showing the MAC and IP addresses of the network devices attached to a particular switch port. The test instrument, upon connection to the LAN, first runs a segment discovery test by passive monitoring and by sending network requests to determine the MAC and IP addresses and device names of each of the network devices on the various segments within the broadcast domain. A database of these MAC and IP address pairs is then compiled.

If the bridge MIB is available from the switch, the test instrument obtains a list of MAC addresses of devices attached to any port. These MAC addresses are then matched by port against the data base to obtain the report of IP and MAC addresses and device names by port. The user may also simply enter a MAC or IP address using a "Find MAC" or "Find IP" command and the test instrument can automatically find and display the port of the switch to which the device having the MAC or IP address is attached.

One object of the present invention is to provide a method of selectively combining information from a set of available MIBs in a network device to create diagnostic information.

Another object of the present invention is to provide a method of selectively combining information from a set of available MIBs in a switch to provide diagnostic information on various LAN segments.

An additional object of the present invention is to provide a test instrument which provides for testing a switched LAN by selectively combining information from a set of available MIBs in a switch to provide diagnostic information on various LAN segments.

A further object of the present invention is to provide a report of MAC and IP addresses attached to each port of a switch in a switched LAN.

Other features, attainments, and advantages will become apparent to those skilled in the art upon a reading of the following description when taken in conjunction with the accompanying drawings.

DETAILED DESCRIPTION OF THE INVENTION

Figure 1:
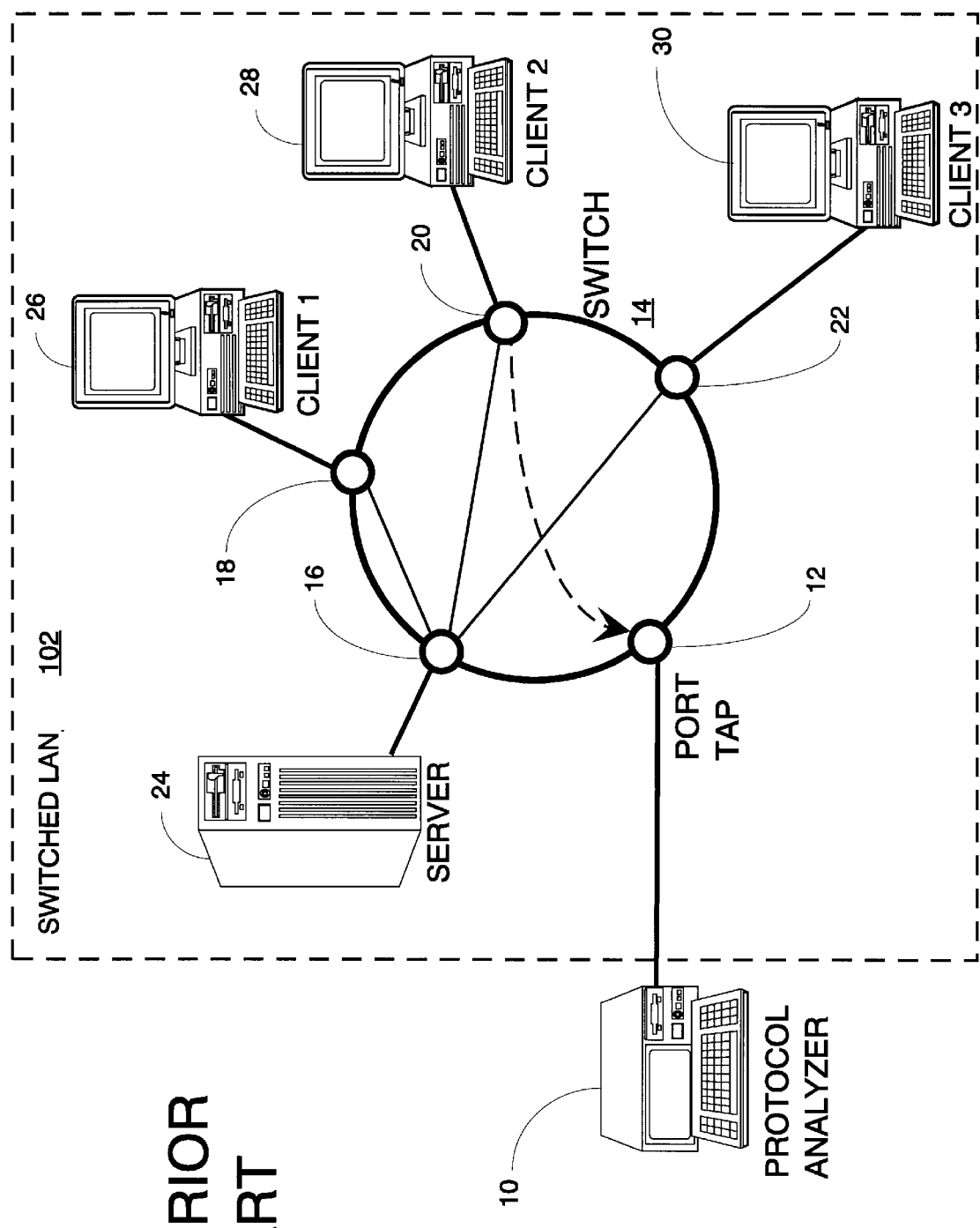
FIG. 1 is a simplified schematic diagram of a protocol analyzer connected to a switch for analysis according to the prior art.

FIG. 1 is a simplified schematic diagram of a protocol analyzer 10 connected to a port tap 12 of a switch 14 in the manner known in the prior art. The switch 14 has ports 16–22 for connection to various devices on a switched LAN, including a server 24 and clients 26, 28, and 30, labeled CLIENT 1, CLIENT 2, and CLIENT 3, respectively. The server 24, switch 14 and clients 26–30 collectively comprise a switched LAN 102. The switch 14 is configured to connect each of the clients 26–30 to the server 24 such that each of the clients is in its own segment. Traffic between the server and each of the clients 26–30 does not appear on the other segments, except for network broadcasts within the same broadcast domain.

In order to accommodate troubleshooting and analysis equipment such as protocol analyzers that rely on capturing the network traffic traveling between the network devices, it is common in switches to provide the port tap 12 as illustrated. The port tap 12 may also be implemented as a circuit tap such that all traffic exchanged between two ports is forwarded to the port tap 12. The port tap 12 may be further implemented as a switch tap such that all traffic to or from a particular port is forwarded to the port tap 12.

Because some ports may be operating at different speeds, such as 10 Megabits/second (Mbps) and 100 Mbps, along with simultaneous use of multiple ports having a high volume of traffic, the use of the port tap 12 is problematic because it may miss critical pieces of network traffic needed for analysis. It may not be possible to forward traffic from a 100 Mbps port if the port tap 12 only has a 10 Mbps speed. The configuration of the port tap 12 is controlled either by using the SNMP agent or by coupling a terminal into a separate control port of the switch 14. Using protocol analyzers to test switched LANs in this fashion tends to be relatively slow and complex and typically requires some advance knowledge of what information is needed and on what segment it may be found.

Figure 2:
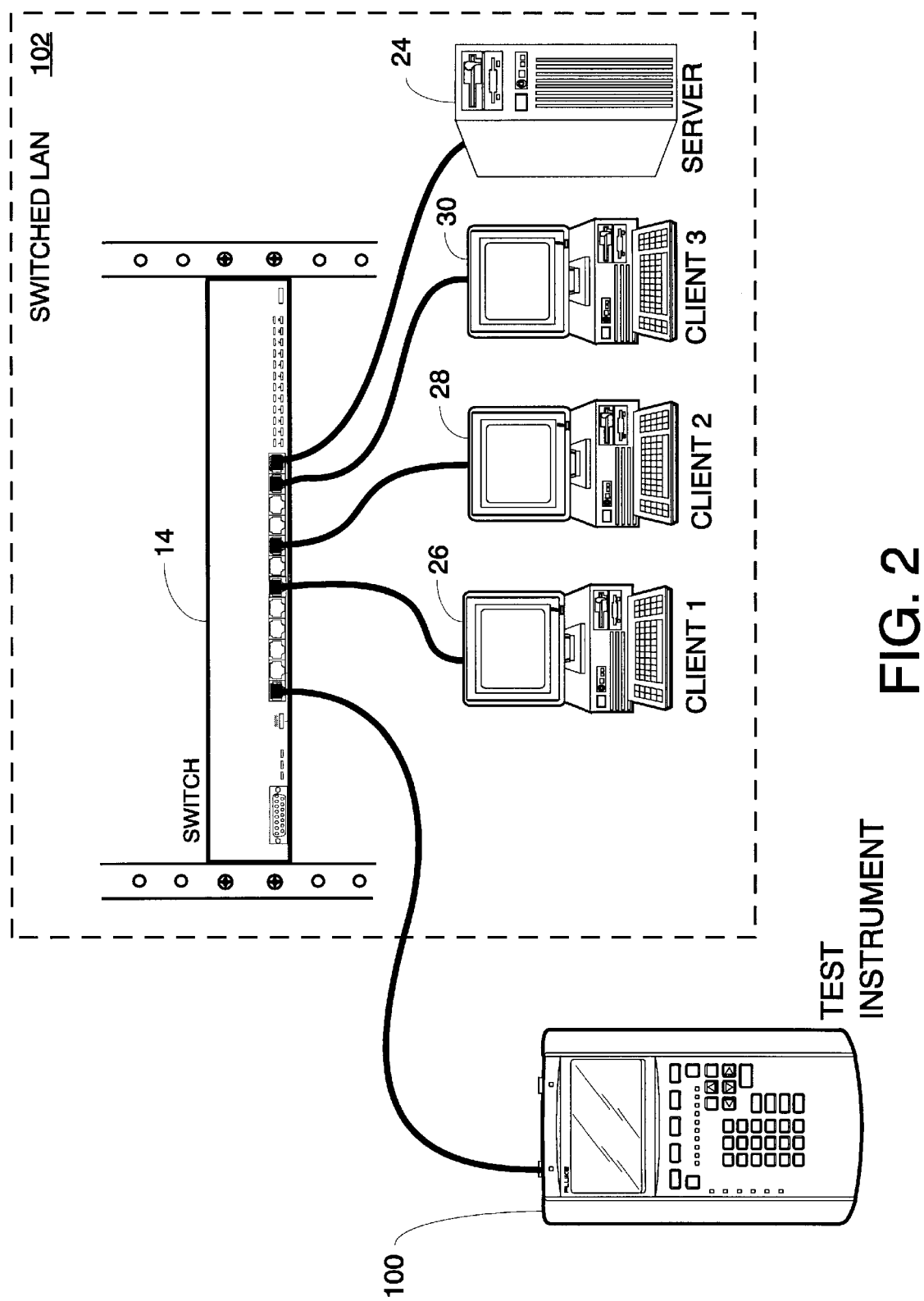
FIG. 2 is an illustration (not to scale) of a test instrument connected to a switched LAN.

In FIG. 2, there is shown an illustration (not to scale) of a test instrument 100 according to the present invention coupled to a switched LAN 102. Test instruments generally must perform functions distinct from those of network management tools. The test instrument may be brought in to test a LAN, either shared, switched, or with some combination of shared and switched segments. Because the LAN may be malfunctioning in some way or have an unknown configuration, it is desirable that the test instrument 100 be capable of obtaining pertinent information to aid in diagnosis and troubleshooting after connection to the LAN with no requirement that the user configure the test instrument ahead of time. It is further desirable that the test instrument 100 be capable of being connected to the switched LAN 102 in any segment with no requirement of using the port tap 12 to forward network traffic for analysis.

The switched LAN 102 comprises the switch 14, server 24, and clients 26–28 (shown in FIG. 1). The test instrument 100 may be connected to any segment of the switched LAN 102, either by itself or with other network devices such as clients or servers. As shown in the illustration, the test instrument 100 is connected directly to a port of the switch 14 and is thus on its own segment.

After connection to the switched LAN 102, the test instrument 100 may then run a segment discovery test to find local hosts, switches, routers, and other network devices. The results of the segment discovery test include the creation of a data base of MAC and IP addresses of the network devices found within the broadcast domain. Upon finding at least one switch, the test instrument 102, using a set of SNMP queries, determines what MIBs are available in the switch 14. From these MIBs, various reports may then be generated using the best available information selectively gathered from the various MIBs to aid the user in diagnosis and troubleshooting of the switched LAN 102. This method is explained in more detail below.

Figure 3:
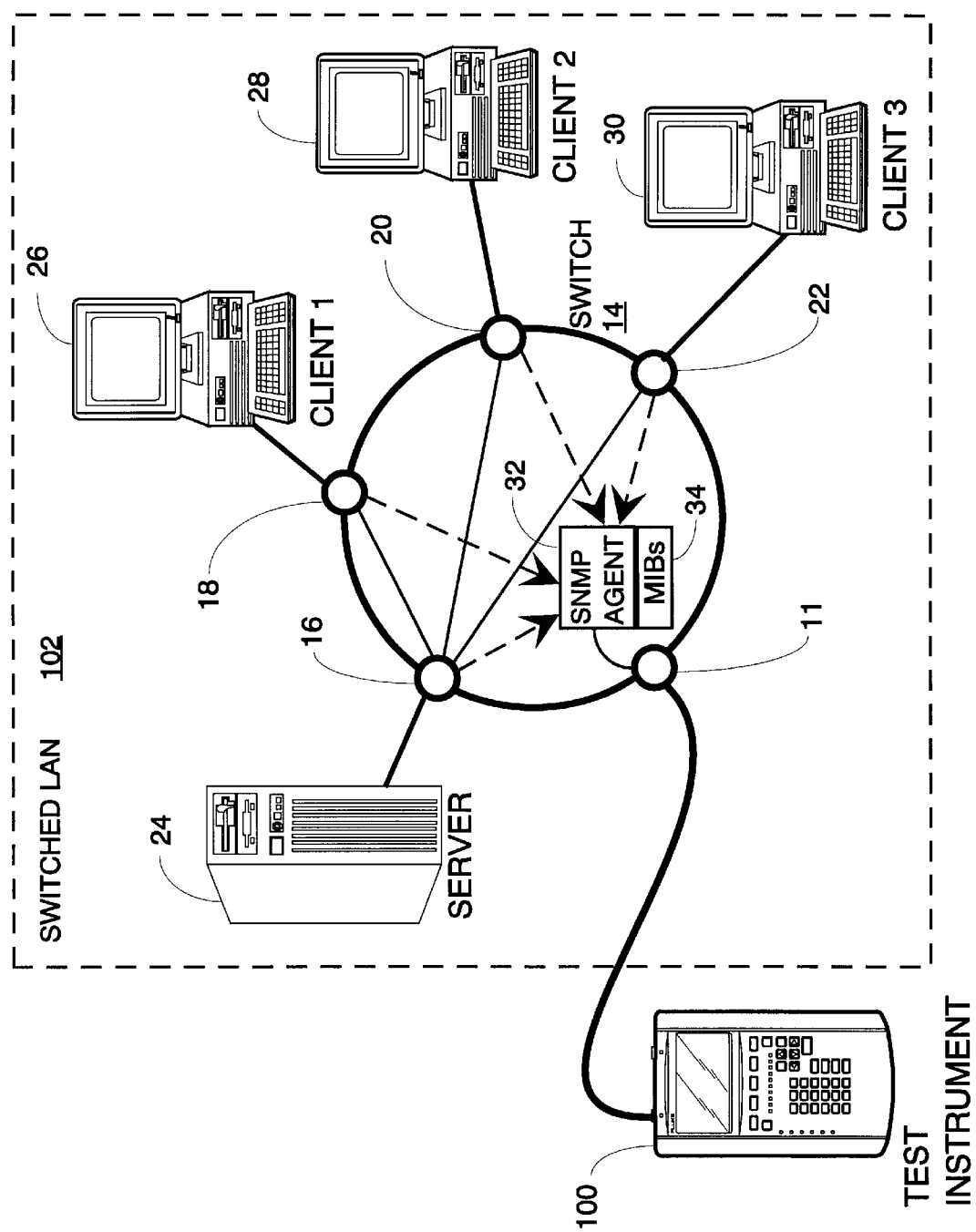
FIG. 3 is a simplified schematic diagram of the test instrument according to the present invention connected to the switched LAN of FIG. 2.

FIG. 3 is a simplified schematic diagram of the test instrument 100 which is connected to a port 11 of the switch 14. Port 11 may be any active port on any segment of the switched LAN 12 and may have other network devices connected to the same segment, typically via a shared hub. Instead of using the port tap 12, the test instrument 100 communicates with an SNMP agent 32 located within the switch 14 which gathers information from each of the ports 11, 16, 18, 20, and 22 according to a set of available MIBs 34. The set of available MIBs 34 are the definitions of data items that the SNMP agent 32 operates against and are usually predetermined at the time of manufacture of the switch 14. Because there are a variety of MIBs that may be supported by any particular switch, the test instrument 100 cannot know ahead of time what MIBs are supported. The set of available MIBs 34 are determined using SNMP queries to the SNMP agent 32, whose IP address was determined during the segment discovery test.

Figure 4:
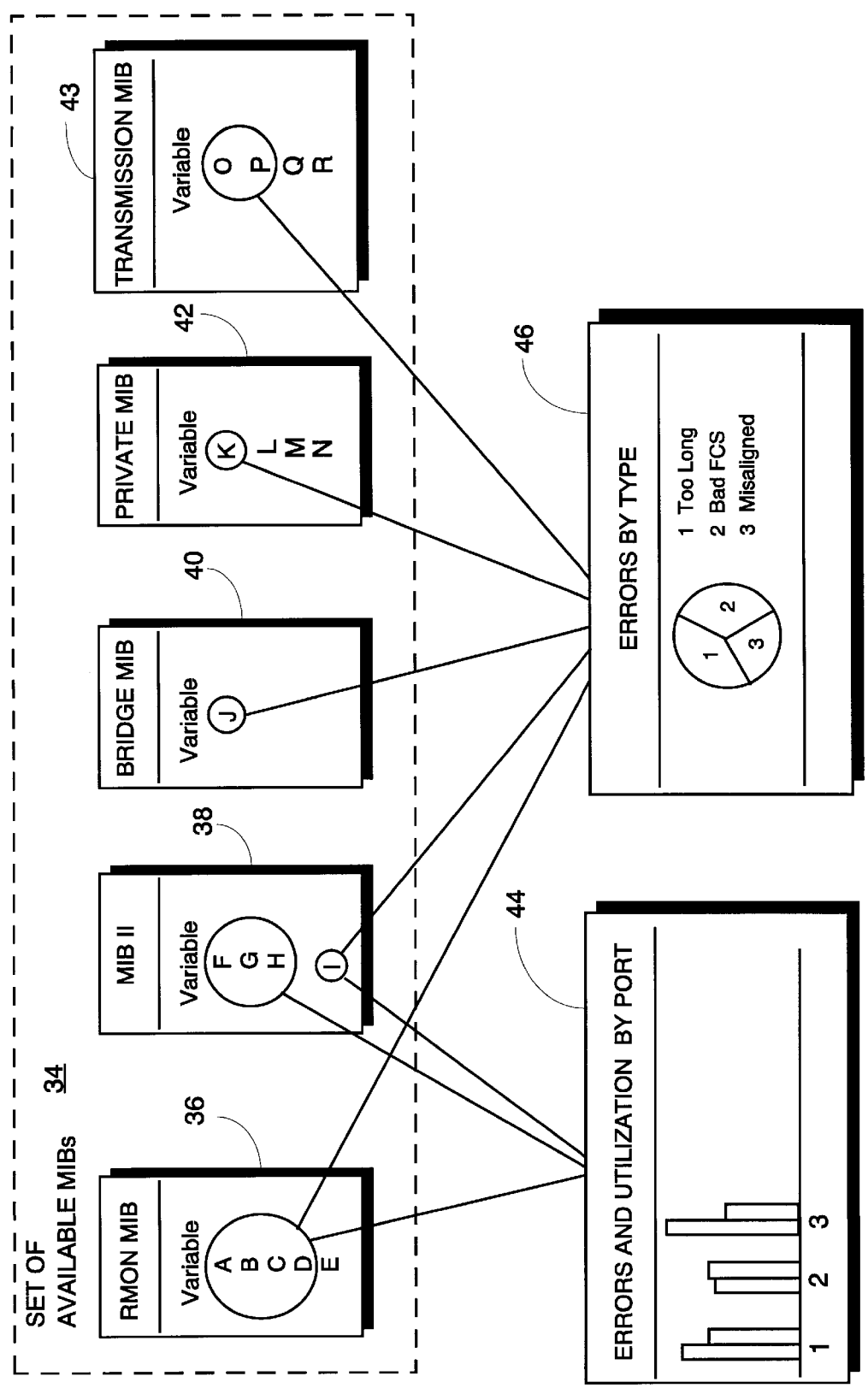
FIG. 4 is an illustration of the method of selectively obtaining information from a set of available MIBs according to the present invention.

FIG. 4 is an illustration of the process of selecting various data items from the set of available MIBs 34. The set of available MIBs 34 in this example comprises the set of available MIBs, which includes an RMON MIB 36, a MIB II 38, a BRIDGE MIB 40, a PRIVATE MIB 42, and a TRANSMISSION MIB 43. The RMON MIB 36 generally provides the most information, particularly for collision and error information. The MIB II 38 is the considered the industry standard MIB and is a default MIB found in most switches. The BRIDGE MIB 40 provides information on the specific MAC addresses and port addresses of the switch 14 and as well as the MAC addresses of the local hosts on each of the ports of the switch 14. The PRIVATE MIB 42 will vary by vendor. Typically, the information from the PRIVATE MIB 42 can be accessed if the vendor has provided documentation as to the nature of the data items it contains. If the test instrument 100 has been adapted recognize the specific private MIB from a particular vendor, such as Cisco Systems, Inc., then the data items contained in the PRIVATE MIB 42 may be fully utilized. The TRANSMISSION MIB 43 provides information specific to the particular network protocol, such as Ethernet or Token Ring, which may vary by each of the ports 16–22. It is possible that the switch 14 will support different protocols on different ports so that multiple TRANSMISSION MIBs 43 are available according to each of the ports 16–22.

The various data items from the set of available MIBs 34 are then selectively used to generate reports requested, including reports 44 and 46 as shown. The optimal data item for a particular type of information needed for a report is chosen from the set of available MIBs 34 according to a predetermined hierarchy has been programmed into the test instrument 100. Optimal data items are those which provide the most detailed or pertinent information for the purposes of creating a report. Different switch ports or interfaces involved in the report may be require different sets of available MIBs 34 or different optimal data items from the sets of available MIBs 34.

In the example shown, data items A, B, C, and D from the RMON MIB 36 and data items F, G, H, and I from the MIB II 38 are chosen to generate the report 44 labeled ERRORS AND UTILIZATION BY PORT. Data item I from the MIB II 38, data item J from the BRIDGE MIB 40, data item K from the PRIVATE MIB 42, and data items O and P from the TRANSMISSION MIB 43 are chosen to generate the report 46 labeled ERRORS BY TYPE. If different MIBs share the same data item, the choice of MIB from which to obtain the data item is prioritized.

Figure 5:
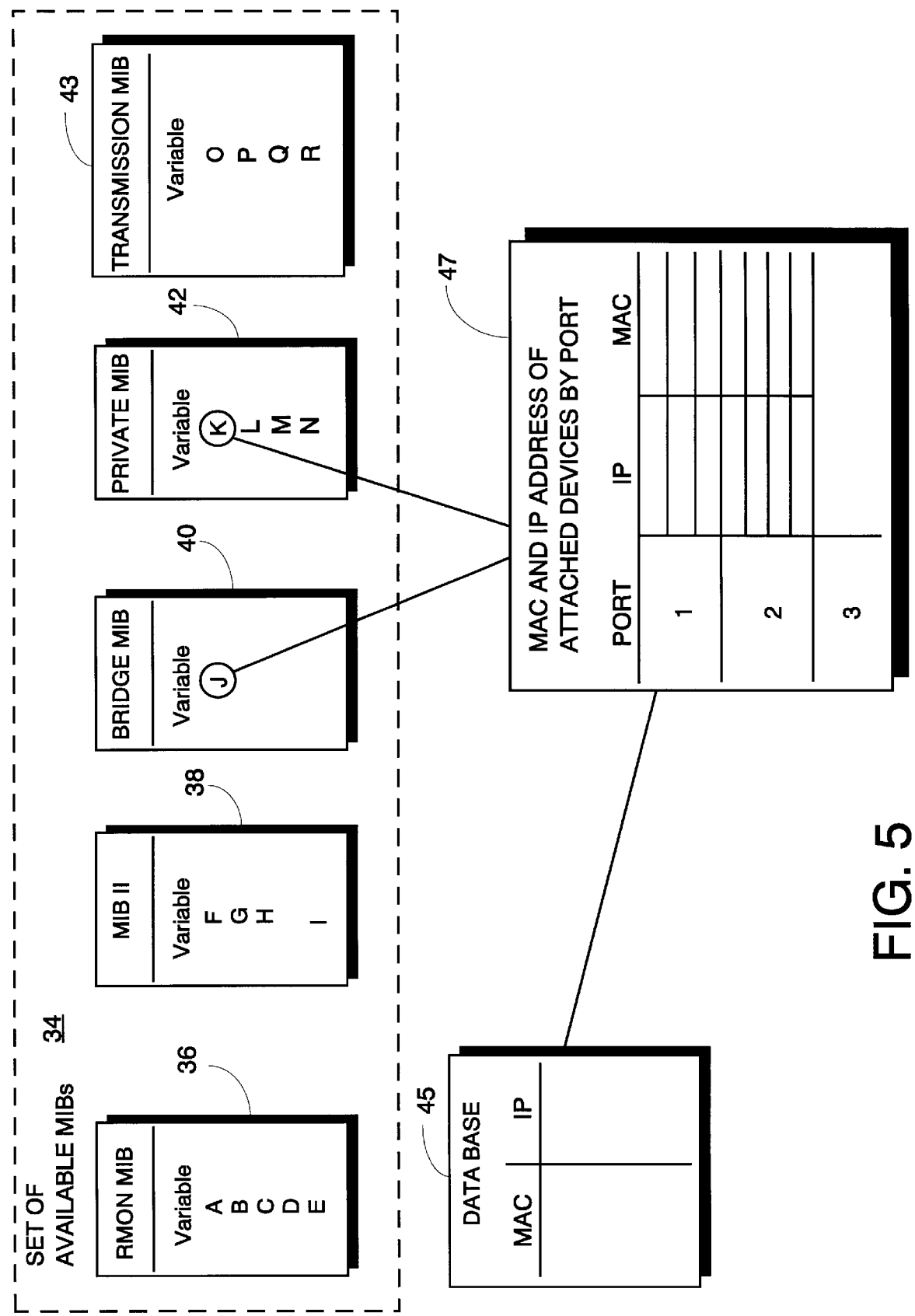
FIG. 5 is an illustration of the method of selectively obtaining MAC address by port information from the bridge MIB and a data base to generate a report of MAC and IP addresses by port.

FIG. 5 is an illustration of the process of selecting various data items from the set of available MIBs 34 and a data base 45 to obtain a report 47 titled MAC AND IP ADDRESS OF ATTACHED DEVICES BY PORT. The data base 45 is compiled as a result of the segment discovery test in which the MAC and IP pairs of the network devices are compiled in the data base 45.

It is desirable to obtain the report 47 showing MAC and IP addresses of devices attached to each port. A table of MAC addresses of devices attached to each port is obtained from the BRIDGE MIB 40 and matched against the MAC and IP address pairs stored in the data base 45. Additionally, tables of MAC addresses of devices attached to each port may be found in the PRIVATE MIB 42, data item K, from various vendors. From this matching between the MAC tables and the data base 45, a report showing the MAC and IP address pairs of devices attached to each port of the switch 14 may be obtained.

Simply using the MAC table from the BRIDGE MIB 40 will not allow the user to determine the port to which a network device is attached if only the IP address of the network device is available. Therefore it is desirable to obtain further reports called "Find MAC" and "Find IP" (not illustrated) in which the MAC or IP address of a network device is known and the user needs to determine the switch port to which the network device is attached. The user enters the MAC or IP address of the network device, and the entry is compared against the table of MAC addresses from the BRIDGE MIB 40, along with the data base of MAC and IP addresses, to generate a report showing the port of the switch 14 to which the network device is attached.

Figure 6:
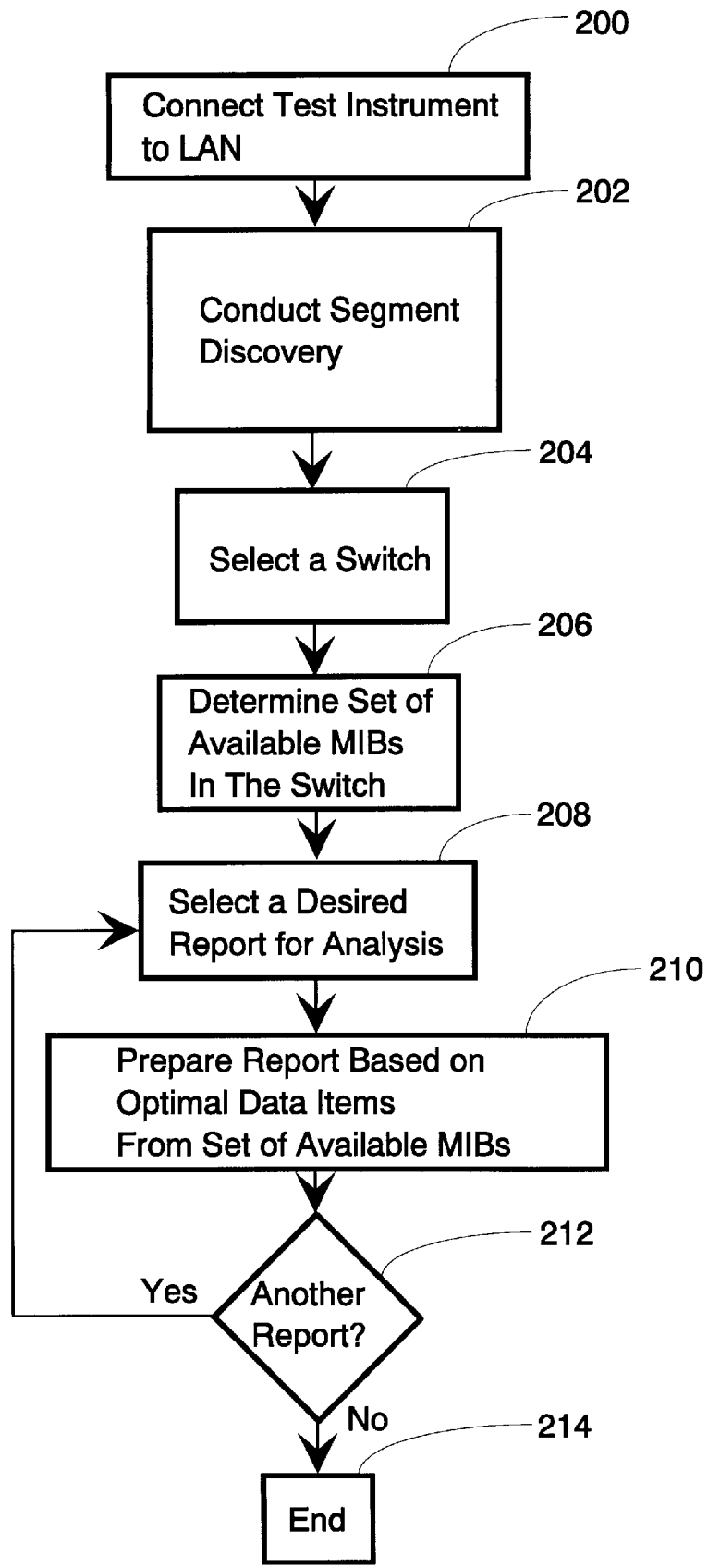
FIG. 6 is a flow diagram of the method of selectively obtaining information from the set of available MIBs according to the present invention.

FIG. 6 is a flow diagram of the method for testing switched LANs according to the present invention. In step 200 labeled "Connect Test Instrument to LAN", the test instrument 100 is connected to the switched LAN 102 (shown in FIG. 2) on any segment of the switched LAN 102 and with no prior configuration of the test instrument 100 required.

In step 202 labeled "Conduct Segment Discovery", the test instrument 100 may detect the presence of a switch by sending a series of IP broadcast requests unique to switches to elicit a response or by passive monitoring to detect network traffic unique to switches including spanning tree and lattis span frames. The segment discovery test in addition may be used for detecting and identifying many other devices such as clients, servers, switches, and routers within the broadcast domain, typically using a combination of passive monitoring and a set of active broadcast messages to obtain responses from as many network devices as possible. Because broadcast messages are typically forwarded across segments by the switch 14, network devices within the same broadcast domain but on the another segment or port of the switch 14 may be discovered. A data base of MAC and IP addresses, along with other associated device information such as the device name, may be compiled in order to characterize the network devices on the switched LAN 102.

In step 204 labeled "Select a Switch", the test instrument 100 may display the switches found during segment discovery and provide the user the option of selecting a particular switch for further analysis. Alternatively, all the switches found in the LAN may be further analyzed as needed for the generation of reports.

In step 206 labeled "Determine Set of Available MIBs In the Switch", the test instrument 100 sends SNMP commands to the SNMP agent in the switch 14 to determine the set of available MIBs 34 (shown in FIG. 4). The set of available MIBs 34 may comprise as few as one MIB in order to obtain reports.

In step 208 labeled "Select a Desired Report for Analysis", the user may select from a set of reports designed to aid in the test, diagnosis, and troubleshooting of the switched LAN 102. The reports may be selected in a variety of ways. In the preferred embodiment, reports having increasing levels of detail about a selected item, such as a report of the types of errors occurring on a selected port which is shown as report 46 in FIG. 4, may be called using softkeys or menu items available in another report, such a report listing the errors and utilization by port, shown as report 44 in FIG. 4.

In step 210 labeled "Prepare Report Based on Optimal Data Items from Set of Available MIBs", the character and detail of the reports may change responsive to the type of information available from the set of available MIBs 34. If data items such as detailed statistical information are available from the switch 14 because it supports the RMON MIB 36, the test instrument 100 may then prepare more detailed reports of error and usage statistics than if only the MIB II 38 is available. Optimal data items are those that provide the most detailed, pertinent information for a given report. A hierarchy of data items may be used to determine the optimal data item for any given report, set of available MIBs 34, and as well as particular ports or interfaces of the switch 14.

In step 212 labeled "Another Report?", the user may continue selecting additional reports, which are typically in a hierarchy, either moving down to greater levels of detail, as noted above, or to different types of reports that may aid in the analysis and test of the switched LAN 102.

In step 214 labeled "End" the method ends but may be readily re-started in order to repetitively test the same switched LAN 102.

It will be obvious to those having ordinary skill in the art that many changes may be made in the details of the above described preferred embodiments of the invention without departing from the spirit of the invention in its broader aspects. For example, this method may be readily applied to other link level LAN technologies such as FDDI, ATM (asynchronous transfer mode), and others. This method may also be readily applied to any network device, such as bridges and routers, employing SNMP agents which store data items according to a set of MIBs. Therefore, the scope of the present invention should be determined by the following claims.

What we claim as our invention is:

1. A method for testing a switched local area network, comprising:

(a) detecting at least one switch in said switched local area network;

(b) communicating with an SNMP agent in said switch to obtain a set of available MIBs (management information bases) in said switch;

(c) selecting a report, said report determined according to said set of available MIBs;

(d) communicating with said SNMP agent to obtain optimal data items selected according to said set of available MIBs and said report; and (e) preparing said report based on said optimal data items.

2. A method for testing a switched local area network according to claim 1 further comprising selecting further reports according to said set of available MIBs.

3. A method for testing a switched local area network according to claim 2 wherein said further reports are selected according to a hierarchical structure.

4. A method for testing a switched local area network according to claim 1 further comprising determining said optimal data items according to at least one port of said switch.

5. A method for testing a switched local area network according to claim 1 further comprising:

(a) conducting a segment discovery test; and (b) compiling a data base of MAC and IP addresses of network devices on said switched local area network found by said segment discovery test.

6. A method for testing a switched local area network according to claim 5 further comprising:

(a) communicating with said SNMP agent to obtain a table of MAC addresses attached by port to said switch according to a bridge MIB; and (b) creating a report showing MAC and IP addresses of said network devices attached by said port using said data base and said table.

7. A method for testing a switched local area network according to claim 5 further comprising:

(a) communicating with said SNMP agent to obtain a table of MAC addresses attached by port to said switch according to a bridge MIB; and (b) comparing one of a MAC address and an IP address of a network device to said table and said data base to determine said port of said switch that said network device is attached to.

8. In a test instrument, a method for testing a switched local area network, comprising:

(a) coupling said test instrument to said switched local area network;

(b) detecting at least one switch in said switched local area network;

(c) communicating with an SNMP agent in said switch to obtain a set of available MIBs (management information bases) in said switch;

(d) selecting a report, said report determined according to said set of available MIBs;

(e) communicating with said SNMP agent to obtain optimal data items selected according to said set of available MIBs and said report; and (f) preparing said report based on said optimal data items.

9. In a test instrument, a method for testing a switched local area network according to claim 8 further comprising selecting further reports according to said set of available MIBs.

10. In a test instrument, a method for testing a switched local area network according to claim 9 wherein said further reports are selected according to a hierarchical structure.

11. In a test instrument, a method for testing a switched local area network according to claim 8 further comprising determining said optimal data items according to at least one port of said switch.

12. In a test instrument, a method for testing a switched local area network according to claim 8 further comprising:

(a) conducting a segment discovery test; and (b) compiling a data base of MAC and IP addresses of network devices on said switched local area network found by said segment discovery test.

13. In a test instrument, a method for testing a switched local area network according to claim 12 further comprising:

(a) communicating with said SNMP agent to obtain a table of MAC addresses attached by port to said switch according to a bridge MIB; and (b) creating a report showing MAC and IP addresses of said network devices attached by said port using said data base and said table.

14. In a test instrument, a method for testing a switched local area network according to claim 12 further comprising:

(a) communicating with said SNMP agent to obtain a table of MAC addresses attached by port to said switch according to a bridge MIB; and (b) comparing one of a MAC address and an IP addresses of a network device to said table and said data base to determine said port that said network device is attached to.

* * * * *